United States Patent [19]

Brusaglino et al.

[11] 4,109,743

[45] Aug. 29, 1978

[54] PROPULSION UNIT FOR VEHICLES

[75] Inventors: Giampiero Brusaglino, Turin; Giovanni Savonuzzi, Moncalieri (Turin), both of Italy

[73] Assignee: FIAT Societa per Azioni, Turin, Italy

[21] Appl. No.: 767,191

[22] Filed: Feb. 9, 1977

[30] Foreign Application Priority Data

Feb. 24, 1976 [IT] Italy ................. 67411 A/76

[51] Int. Cl.² ................ B60L 11/16; B60L 11/04
[52] U.S. Cl. .................. 180/65 C; 290/17; 318/154
[58] Field of Search ............. 180/65 C, 65 B, 65 A, 180/65 D, 65 E, 60; 318/154, 153, 152, 151; 290/17, 14, 11, 10, 9, 45

[56] References Cited

U.S. PATENT DOCUMENTS

| 2,437,011 | 2/1948 | Weier ................. 290/14 |
| 2,443,770 | 6/1948 | Kasschau .......... 180/65 C |
| 2,581,596 | 1/1952 | Nims ................. 180/65 C |
| 3,263,142 | 7/1966 | Adoutte et al. ...... 318/154 X |
| 3,493,066 | 2/1970 | Dooley ............... 180/54 R |
| 3,525,874 | 8/1970 | Toy ................... 180/65 A X |
| 3,713,504 | 1/1973 | Shimer et al. ....... 180/65 C |
| 3,837,419 | 9/1976 | Nakamura ........... 180/65 C |

*Primary Examiner*—Kenneth H. Betts
*Assistant Examiner*—Milton L. Smith
*Attorney, Agent, or Firm*—Sughrue, Rothwell, Mion, Zinn and Macpeak

[57] ABSTRACT

A mixed propulsion system comprising a turbine unit having two output shafts which drive two counter rotating flywheels and, via a reduction gearbox, two generators which generate electricity to drive two electric drive motors the output shafts of which are connected to the wheels of the vehicle. A control system is provided, linked to the accelerator and brake pedal of the vehicle, for controlling the excitation of the field windings of the generators and the motors such that a predetermined excitation pattern is followed. The turbine unit is automatically controlled to run when the speed of the flywheels falls below a lower threshold value and is turned off when the flywheels reach a predetermined maximum threshold speed.

4 Claims, 3 Drawing Figures

PROPULSION UNIT FOR VEHICLES

BACKGROUND OF THE INVENTION

The present invention relates to a propulsion unit for motor land vehicles, and particularly to a unit of the type comprising a turbine which drives electrical generators which feed electric drive motors. Propulsion units of this type are particularly suitable for installation on public transport vehicles, such as urban and suburban buses, and for use in areas of high traffic density because the turbines, since they only have to drive electrical generators, can be controlled accurately to run in such a way that the pollutant content of the exhaust gases is minimised.

Such a prior propulsion unit comprised an internal combustion engine, in the case in point, a turbine, an alternator driven by the turbine, a battery charged by the alternator, and an electric motor which drives the wheels of the vehicle and which is itself driven by either the battery or the alternator, according to the operating conditions, under the control of an electronic control circuit incorporating sensors provided inter alia for the purpose of detecting the state of charge of the battery.

The presence of a battery, however, although necessary for meeting the requirements of low pollution when travelling in regions of high traffic density, considerably increases the overall weight of the vehicle.

OBJECTS OF THE INVENTION

The primary object of the present invention is to provide a mixed propulsion unit which satisfies all the low pollution requirements.

Another object of the invention is to provide a mixed propulsion unit which is of reduced weight with respect to that of previously known such units which are provided with a battery.

A further object of the invention is to provide a mixed propulsion unit which can be manufactured at low cost.

SUMMARY OF THE INVENTION

According to the present invention, there is provided, in a propulsion unit for motor vehicles comprising:

a biaxial turbine unit, an electric generator connected to said turbine unit to be driven thereby and an electric motor connected to at least one of the wheels of said vehicle, the improvement wherein:

between said biaxial turbine unit and said electric generator there is interposed a flywheel system operating to store kinetic energy from the rotation of said turbine unit.

Other characteristics and advantages of the present invention will become apparent from a consideration of the following detailed description of a preferred embodiment of the invention, in which reference is made to the accompanying drawings, which description is provided by way of non-limitative example only.

DESCRIPTION OF THE PREFERRED EMBODIMENT

Figure 1:
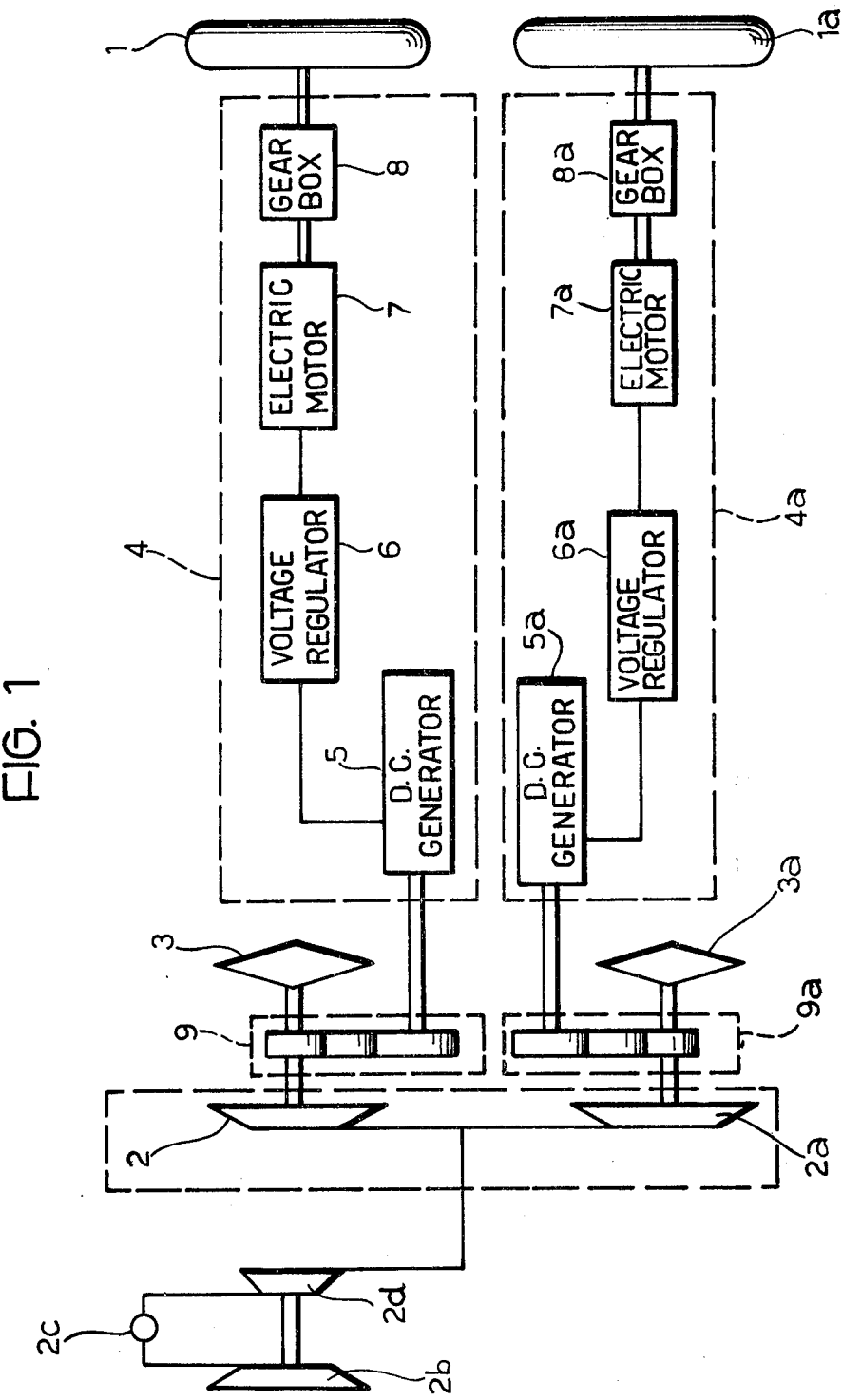
FIG. 1 is a schematic diagram of a propulsion unit according to the invention.

In FIG. 1 the reference numeral 1 indicates the wheel of a vehicle (not shown). The vehicle is fitted with a propulsion unit according to the invention and including a biaxial turbine unit having two turbine rotors generally indicated by 2 and 2a, each mechanically connected to a respective flywheel 3 and 3a. These flywheels are counter-rotating when driven so as to eliminate or reduce the gyroscopic effects on the vehicle. The two turbines 2 and 2a are fed through a compressor 2b, a combustion chamber 2c and an auxiliary turbine 2d which drives the compressor 2b.

Each of the turbines 2 and 2a is mechanically connected via a reduction gearbox 9, 9a to a control unit 4, 4a respectively, each of which is, in turn, mechanically connected to the wheel 1, 1a of the vehicle.

Each control unit 4, 4a comprises, respectively, a d.c. electric generator 5, 5a voltage regulator 6, 6a an electric drive motor 7, 7a electrically connected through the regulator 6, 6a to the generator 5, 5a and a reduction gearbox 8, 8a mechanically interposed between the electric motor 7, 7a and the associated wheel 1, 1a of the vehicle. The two turbine rotors 2 and 2a and the two counter-rotating flywheels 3 and 3a, are mechanically connected to their respective d.c. generator 5, 5a by a respective one of the reduction gearboxes 9, 9a and each of the two electric drive motors 7, 7a drives the road wheels of a respective axle of the vehicle, but could eventually be replaced by a group of motors.

The two control units and therefore the two turbines are simultaneously controlled, as will be described hereinbelow, by a common control signal. The machines 7, 7a are d.c. motors with separate excitation and of a size as to produce the power required to drive the vehicle, whilst the machines 5, 5a are d.c. generators of a size such as to produce exactly the electrical power required by the motors 7, 7a and, consequently, the machines 5, 5a and 7, 7a are interchangeable with one another.

When the propulsion unit is first started up the turbines 2, 2a start to rotate but the drive motors 7, 7a are stationary because there is no output signal from either of the voltage regulators 6, 6a. Thus, with the vehicle stationary the biaxial turbine will supply the counter-rotating flywheels 3 and 3a with that amount of power "p" required to accelerate the flywheels up to a constant rotational speed and then enough power to keep them at this speed by turning off as the flywheels reach an upper threshold and back on again when they reach a lower threshold speed. Depression of the accelerator pedal of the vehicle causes, as will be described in greater detail below, excitation of the generators, 5, 5a and this progressively increases the armature voltage applied to the drive motors 7, 7a. The field windings of these drive motors 7, 7a at this stage are connected to a constant voltage source which produces an output voltage corresponding to the maximum value of the excitation current which can be fed to the field windings. This voltage, hereinafter termed the maximum excitation voltage could be, for example, the same voltage as is supplied by the generators 5, 5a. By gradually increasing the excitation voltage applied to the generators 5, 5a and therefore the voltage across their armature circuits the speed of rotation of the electric motors 7, 7a and therefore of the road wheels 1, 1a is proportionally increased.

When the voltage delivered by the generators 5, 5a reaches the rated value of the plant, if one wishes further to increase the speed of the vehicle, it is necessary gradually to de-excite the drive motors 7, 7a.

For this purpose, it is necessary suitably to act, through the voltage control system in a manner described in greater detail below, on the excitation of the field windings of the motors 7, 7a and the generators 6, 6a alternatively, such that when the field windings of the generators 5, 5a are completely excited the field windings of the drive motors are gradually de-excited thus further increasing the speed.

During this phase, the counter-rotating flywheels 3 and 3a deliver energy and consequently their rotational speed drops: if it drops below a predetermined threshold speed a sensor detects this and, through a control system causes the biaxial turbine to be restarted.

Upon braking, energy recovery can take place, in which case the motors 7, 7a and the generators 5, 5a reverse their previous functions and, therefore, by suitably acting on their excitations, it is possible to provide for increasing the speed of the flywheels by driving them back through the output shaft of the reduction gearbox 9, 9a. Thus, as will be described in more detail below, when the accelerator pedal is released, and also when the brake pedal is depressed, the excitation of the two drive motors 7, 7a is controlled such that they will maintain a delivery of current almost sufficient for braking the vehicle.

Figure 2:
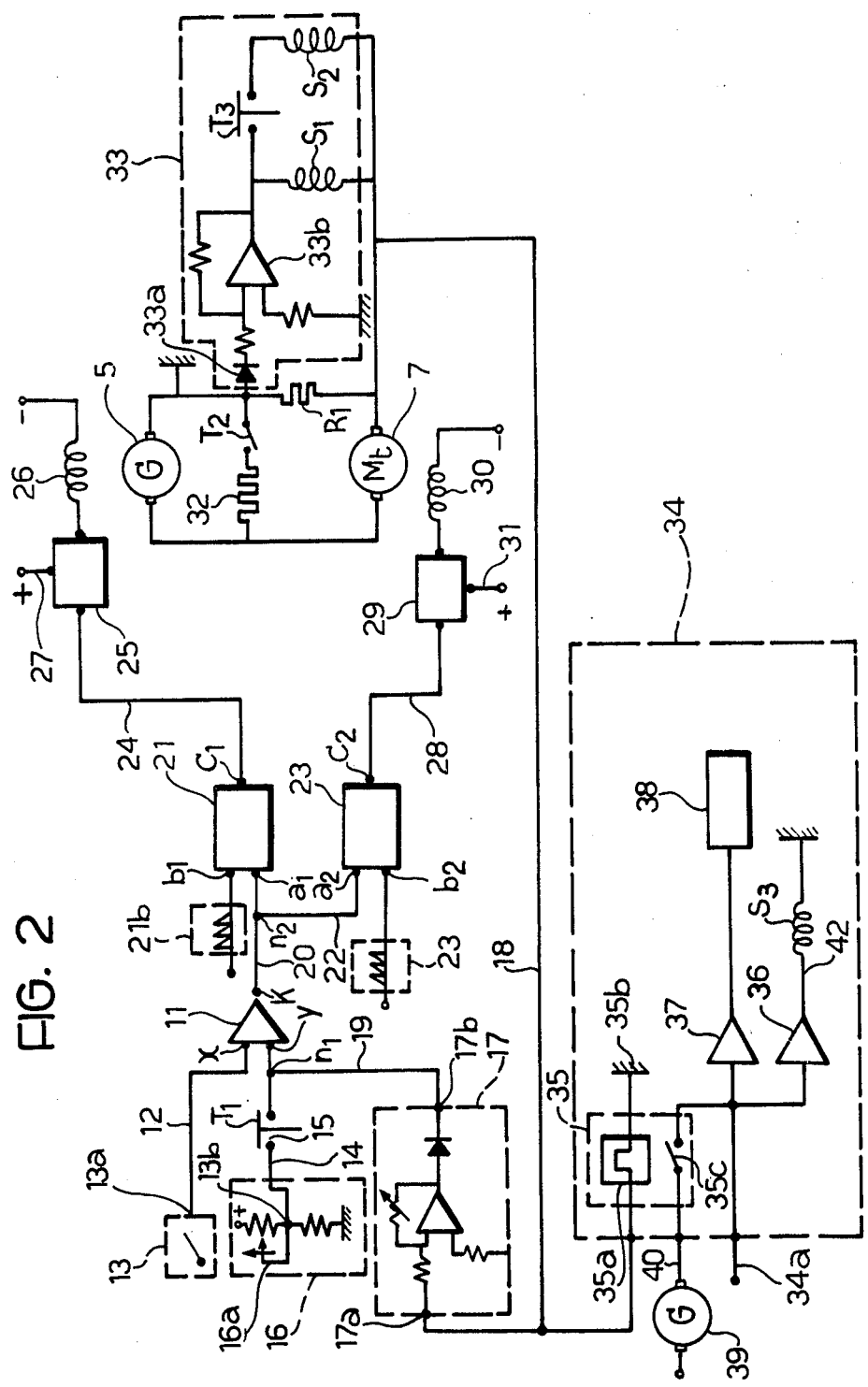
FIG. 2 is a diagram illustrating the regulation and control circuitry of the unit according to the invention shown in FIG. 1.

Reference will now be made to FIG. 2 which is a schematic electrical diagram illustrating one of the voltage regulators, namely the regulator 6 of the control unit 4. The vehicle accelerator pedal is schematically illustrated by the box 13 which also represents means associated therewith for producing an output signal the voltage of which varies as a function of the depression of the accelerator pedal. This output signal is fed along a conductor 12 to one input x of a comparator circuit 11, and along a conductor 13a, to the voltage regulator 6a of the other control unit 4a. The other input y of the comparator circuit 11 is fed with a voltage signal representing the depression of the brake pedal, this signal being derived from a voltage divider 16 the wiper 16a of which is connected for movement with the brake pedal of the vehicle, and fed to the comparator 11 along a conductor 14 via the normally open contact, 15 of a relay T1. The output signal from the voltage divider 16 is also fed along a conductor 13b to the voltage regulator 6a of the control unit 4a. The input y of the comparator is also fed with the output signal from a differential amplifying unit 17 along a conductor 19 which joins the conductor 14 at a junction point $n1$. The input 17a of the differential amplifier 17 is fed by a signal, on a conductor 18, which signal, as will be explained below, is proportional to the current circulating in the associated drive motor 7.

The output $k$ of the comparator 11 is connected by a conductor 20 to a first input $a1$ of a first control circuit 21 having a second input $b1$ which is connected to a sawtooth waveform generator 21b.

The output of the comparator 11 is also connected, by a conductor 22 joined to the conductor 20 at a junction point $n2$, to a first input $a2$ of a second control circuit 23 having a second input which is connected to a second sawtooth waveform generator 23b.

The output $c1$ of the said first control circuit 21 is connected, by a conductor 24, to a control input of a chopper 25 which controls the field winding 26 of the generator 5; the output $c2$ of the said second control circuit 23 is connected, by a conductor 28, to the control input of a chopper 29 which controls the field windings 30 of the drive motor 7; the choppers 25 and 29 are fed, via respective conductors 27, 31 from a positive voltage supply to the field windings of the generator 5 and the drive motor 7, which are connected together through a resistance R1. Across the terminals of the resistance R1 is shunted a braking sensor circuit generally indicated 33 and comprising a diode 33a and an amplifier 33b the output of which directly feeds a control coil S1 of the relay T1 and, through the normally open contacts of a relay T3 feeds a control coil S2 of the relay T2. One terminal of the armature of the motor 7 is connected through the conductor 18 to the input 17a of the differential amplifier 17.

In parallel with the machines 5 and 7 there is a resistance 32 in series with the contact of a relay T2.

The signal on the conductor 18 is also fed to a control unit, generally indicated by the reference numeral 34, comprising a thermal relay 35 the coil 35a of which is connected between the conductor 18 and earth at a point indicated 35b. The control unit 35 also includes a tachometric dynamo not shown in FIG. 2 and connected to the terminal 34a, which measures the speed of the flywheels and is connected, through an amplifier 36, to a coil S3 of a relay T3, and through a hysteresis amplifier 37 to a control circuit 38 which controls the starting and stopping of the turbine unit 2, 2a of FIG. 1.

The inputs of the amplifiers 36 and 37 are connected together and are also connected to a voltage source 39 by a conductor 40 in which is inserted the contact 35c of the thermal relay 35.

OPERATION

Figure 3:
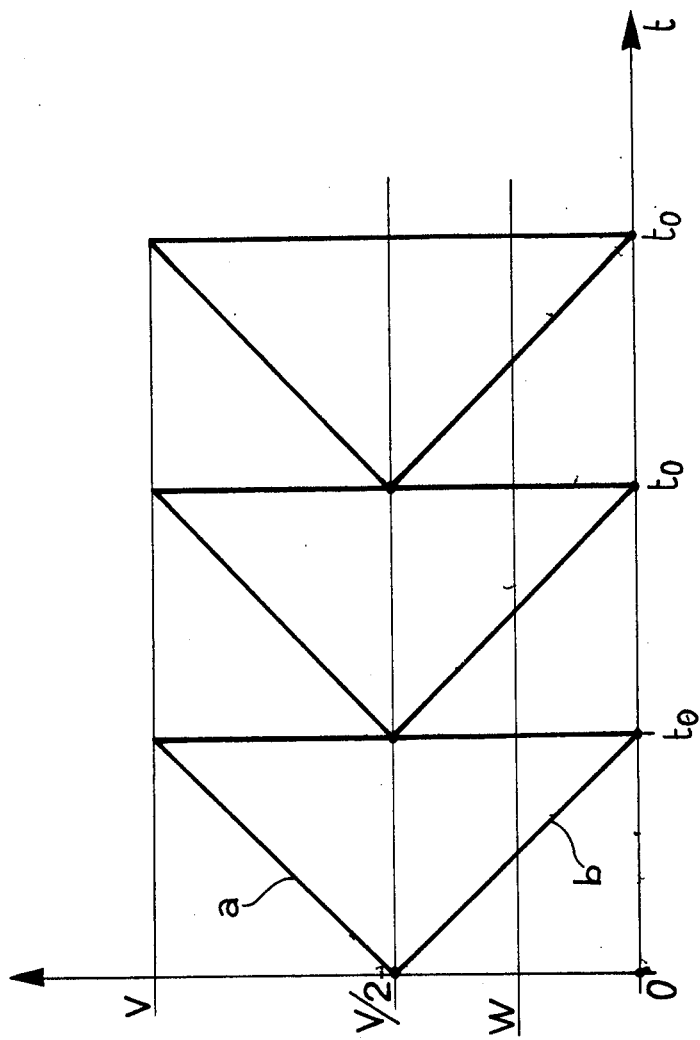
FIG. 3 is a diagram illustating some electrical waveforms useful in describing the operation of the invention.

The operation of the unit described in relation to FIGS. 1 and 2 is as follows:

When the turbines 2, 2a have driven the flywheels 3, 3a up to speed, pressing down the accelerator pedal 13 generates a signal which is fed to the comparator 11. By suitably adjusting the gain of the amplifier 17 the input 17a of which is fed with a signal proportional to the current flowing in the armature of the drive motor 7 an appropriate correction signal is fed to the $y$ input of the amplifier 11. The signal generated in response to depression of the accelerator pedal 13 is thus reduced by the amplifier in such a manner that the current eventually delivered to the field windings of the motor 7 does not ever exceed the maximum safe value for the unit. The amplifying unit 17 and the comparator amplifier 11 therefore serve to introduce an automatic limitation of the current. The output signal from the comparator amplifier is fed by the conductors 20 and 22 to the inputs $a1$ and $a2$ respectively, of the control circuits 21 and 23. The other inputs $b1$ and $b2$ respectively are fed with sawtooth waveforms from the generators 21b, 23b respectively. FIG. 3 shows the curves of the voltage V of the two sawtooth waveforms as a function of time; the waveform produced by the generator 21b has a descending ramp obtained, for example, by means of a capacitor discharge circuit, whilst the waveform produced by the generator 23b has an ascending ramp and is produced, for example, by means of a capacitor charging circuit. As can be seen from FIG. 3 the two sawtooth waveforms are of equal frequency and in phase opposition. FIG. 3 also shows a typical value of the voltage W at the junction point $n2$, having, in this case, a lower value than $V/2$.

The instantaneous values of the voltage of the descending ramp sawtooth waveform $b$ produced by the said generator $21b$ and fed to the input $b1$, of the said control circuit 21 are always lower than those of the voltage of the ascending ramp sawtooth waveform $a$ produced by the generator $23b$ and fed to the input $b2$ of the control circuit 23, the ramp $b$ varying between 0 and $V/2$ and the ramp $a$ varying between $V/2$ and V.

The control circuit 21 is of conventional type and operates such that if the input voltage at its input $a1$ is lower than the maximum value of the sawtooth applied to its input $b1$, it emits a pulse at the output $c1$ when the instantaneous values become equal, whereas, if the voltage at the input $a1$ is higher than the maximum sawtooth value at the input $b1$, it emits a pulse at the beginning of each descending ramp of the sawtooth. Likewise the control circuit 23 is of conventional type, and operates such that if the voltage applied to its input $a2$ is higher than its minimum value $V/2$, it emits a pulse at the output $c2$ when the instantaneous values of the two voltages are equal, whereas if the input voltage at $a2$ is lower than the minimum value $V/2$ of the sawtooth applied to the input $b2$, it emits a pulse at the beginning of each ascending ramp of the sawtooth.

The control signals produced at the outputs $c1$ and $c2$ of the control circuits 21 and 23 are thus in the form of trains of pulses which are passed along the conductors 24 and 28 respectively to the control inputs of the choppers 25 and 28, which are normally cut off, to fire these, during intervals determined by the length of the pulses.

As the output signal $w\,l$ from the comparator amplifier 11 rises from 0 to $V/2$, then at no time does the instantaneous voltage of the sawtooth waveform $a$ intersect this output signal. Such intersection takes place only with the descending ramp sawtooth waveform $b$ so that the control circuit 21 generates firing pulses for the chopper 25 which thus excites the field winding 26 of the generator 6, for certain time periods in such a manner that the ratio between conduction and non-conduction intervals of the said chopper changes, with ever increasing conduction intervals, as the input voltage at $a1$ of the control circuit 21 increases from 0 to $V/2$.

The firing instant of the chopper 29 controlling the excitation of the motor 7 remains unchanged during this time, and consequently the degree of excitation of the motor 7 remains unchanged. When the output signal $w$ from the comparator amplifier 11 lies between $V/2$ and V then only the ascending ramp sawtooth waveform $a$ intersects this voltage so that variation of conduction non-conduction times takes place only in the control circuit 23 which generates the firing pulses for the chopper 29 which controls the field winding 30 of the drive motor 7. In fact, as the voltage $w$ increases from $V/2$ to V the ratio between the conduction and non-conduction intervals of the chopper changes with gradually descreasing conduction intervals. During this time the firing of the chopper 25 which controls the excitation of the generator 6 remains unchanged and, therefore, the degree of excitation of the generator 6 remains unchanged.

Thus, as the accelerator pedal 13 depressed, first the field windings of the generator 6 are progressively excited from a minimum to a maximum value while the excitation of the field windings of the drive motor remains constant at its maximum value, and then, when maximum excitation of the generator field windings is reached the excitation of the field windings of the motor 7 is progressively reduced until maximum speed of the motor 7 is achieved.

Upon progressive release of the accelerator pedal 13 the output voltage from the comparator amplifier 11 decreases progressively causing first the progressive excitation of the field windings 30 of the drive motor 7, and subsequently, the de-excitation of the field winding 26 of the generator 5.

During energy recovery braking, the current in the drive motor 7 is inverted in sign and the diode $33a$, of the braking sensor circuit 33, starts conducting and through the amplifier $35b$ feeds current to the coil S1 of the relay T1 the normally open contacts 15 of which therefore close. This increases the input signal to the second input $y$ of the comparator amplifier 11 by adding the signal from the voltage divider 16, which latter signal increases as the brake pedal is progressively depressed in such a way as to cut off the output voltage of differential amplifying unit 17 and maintain the braking current at a predetermined value.

Thus, the motor 7, which now operates as a generator, feeds current to the generator 5 which now operates as a motor to drive the flywheel 3, through the transmission gearbox unit 9 which, being driven from its output shaft, now acts as a step-up gearbox.

It could happen, during braking, that the flywheels 3 and $3a$ might exceed the maximum safe rotational speed for the electromechanical unit, in which case the signal from the tachometric dynamo (not shown), fed to the input $34a$ of the control unit 34, increases to such a high voltage level that it excites through the hysteresis amplifier 36, the coil S3 of the relay T3 thus causing the contacts T3 to close and complete the path from the output of the amplifier $33b$ to coil S2 of the relay T2 thus causing the relay contacts T2 to close switching in the resistance 32 across the terminals of the motor 7. The hysteresis of the amplifier 36 is selected in such a manner that the switching in and out of the resistance 32 occurs, at or around the maximum rotational speed of the flywheels 3, $3a$. The drive motor 7 thus dissipates part of its excess energy in the resistance 32 itself.

The output signal from the tachmetric dynamo (not shown) which is fed to the input $34a$ of the control unit 34, and from there to the hysteresis amplifier 37, serves to control, in dependence on its value, the turning on and turning off of the biaxial turbine through the control circuit 38. The hysteresis of the amplifier 37 is selected in such a manner that the turbine is turned off when a certain threshold maximum rotational speed is reached, and is turned on again when the rotational speed of the flywheels falls below a second (minimum) threshold value.

The signal of the voltage source 39 is fed to the hysteresis amplifier 37 when in the case of, for example, steep and long slopes, it is necessary to run the turbine to assist the electric motor 7. In this case, the current absorbed by the motor 7 is high and the resulting sharp voltage drop in the resistance R1 acts on the coil $35a$ of the relay 35, causing the associated contacts $35c$ to close. The signal from the generator 39 is now fed to the amplifier 37 and, through the control circuit 38, causes the turbine unit to be turned on. Moreover, the voltage drop in the resistance R1 is detected at the input of the amplifier 17 which feeds a lower signal to the input $y$ of the comparator amplifier 11, which signal is proportional to the armature current in the motor 7; this acts through the amplifier 11 proportionally to decrease the signal applied to the inputs a1 and a2 of the control circuits 21 and 23, thus causing, as described above in relation to the operation of these control circuits and the chopper circuits 27, 29, an increase in the excitation of the motor followed by a decrease in the excitation of the generator 5 consequently decreasing the current flowing in the armature of the motor 7.

The voltage divider 16 is provided for the purpose of feeding to the input y of the comparator amplifier 11 a signal which, during energy recovery braking descreases, in proportion to the depression of the brake pedal, the value of the signal fed to the inputs a1 and a2 of the control circuits 21 and 23, causing a displacement in time of the output pulses from the control circuits 21, 23 lowering the excitation of the field windings of the generator 5 (which is operating as a motor in these conditions) and increasing the excitation of the field windings of the motor 7 (which is operating as a generator in these conditions) with a consequent progressive reduction of the current flowing in the armature of the motor 7 during braking as the brake pedal is depressed.

Although the operation of the control unit 4 has been particularly described, it will be appreciated that the operation of the unit 4a is entirely analogous as the signals which depend on the position of the accelerator 13 and the brake pedal of the vehicle are also fed to the voltage control device 6a of the unit 4a.

We claim:

1. In a propulsion unit for motor vehicles comprising:
a biaxial turbine unit,
an electric generator connection to said turbine unit to be driven thereby and
an electric motor connected to at least one of the wheels of said vehicle,
a flywheel system interposed between said biaxial turbine unit and said electric generator to store kinetic energy from the rotation of said turbine unit, and
control means for controlling the excitation of the field windings of said electric generator and said electric motor, said control means comprising:
first and second control circuits each having first and second inputs thereto, means for generating a first control signal the value of which depends on the position of the accelerator of said vehicle,
means feeding said first control signal to said first input of each of said first and second control circuits,
first and second sawtooth waveform generators producing first and second waveform signals having a descending ramp and an ascending ramp respectively, the instantaneous value of said first sawtooth waveform signal being at all times lower than the instantaneous value of said second sawtooth waveform signal,
means connecting the input of said first sawtooth waveform generator with said second input of said first control circuit, and means connecting the output of said second sawtooth waveform generator with said second input of said second control circuit,
first and second chopper circuits,
means connecting the outputs of said first and second control circuits to the inputs of said first and second chopper circuits,
means connecting the outputs of said first and second chopper circuits to the field windings of said electric generator and said electric motor respectively,
each of said control circuits producing an output pulse signal for the control of the conduction period of the associated one of said first and said second choppers commencing, in relation to the associate sawtooth waveform signal, at the instant when the sawtooth waveform signal has the same value as the signal present at said first input thereto, whereby to control the excitation of said field windings in dependence on the value of said control signal.

2. A propulsion unit as in claim 1, wherein said control signal which depends on the position of said vehicle accelerator is produced at the output of a comparator circuit having first and second inputs thereto,
means feeding to said first input a signal representing the position of said accelerator, and
means feeding to said second input a feedback signal which depends on the value of the current flowing in the armature of said elelctric motor.

3. A propulsion unit according to claim 2, wherein said feedback signal which depends on the value of the current flowing in the armature of said electric motor is produced by means sensitive to this current, connected between said electric generator and said electric motor;
a voltage divider controlled by means sensitive to the position of the brake pedal of the vehicle, and
switch means controlled by means sensitive to said motor armature current for connecting the output of said voltage divider to the second input of said comparator whereby to control said comparator to maintain the braking current substantially constant at a predetermined value as the vehicle is braked.

4. A propulsion unit as in claim 3, wherein there is further provided a hysteresis relay having a coil to which is applied a signal representing the motor armature current, said hysteresis relay being operable, when the motor armature current exceeds a predetermined threshold value for a predetermined minimum time period, to cause the turbine to be started and run.

* * * * *